United States Patent Office 3,067,153
Patented Dec. 4, 1962

---

3,067,153
METHOD OF PREPARING BLEND OF RESIN, PIGMENT AND SUCROSE DIACETATE HEXAISOBUTYRATE AND RESULTING COMPOSITION
Kenneth R. Hock and William P. Paige, Midland, Mich., assignors to The Dow Chemical Company, Midland, Mich., a corporation of Delaware
No Drawing. Filed Dec. 27, 1960, Ser. No. 78,327
11 Claims. (Cl. 260—17.4)

This invention relates to a method of preparing pigmented or otherwise colored thermoplastic resinous compositions. More particularly, it relates to a method of providing color concentrates or blends of alkenyl aromatic resin molding granules and colorants in which the colorant is relatively tightly adherent to the granules. Specifically, it relates to a method of preparing color concentrates of the type described that are non-dusty and that may be handled in processing with negligible change in composition.

By an "alkenyl aromatic resin" is meant a solid polymer of one or more polymerizable alkenyl aromatic compounds. Such copolymer comprises in chemically combined form at least 70 percent by weight of at least one alkenyl aromatic compound having the general formula:

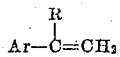

wherein Ar represents an aromatic hydrocarbon radical, or an aromatic halohydrocarbon radical, of the benzene series, and R is hydrogen or the methyl radical. Examples of such alkenyl aromatic resins are the solid homopolymers of styrene, alpha-methylstyrene, ortho-methylstyrene, meta-methylstyrene, para-methylstyrene, ar-ethylstyrene, or ar-chlorostyrene; the solid copolymers of two or more such alkenyl aromatic compounds with one another; and solid copolymers of one or more of such alkenyl aromatic compounds with other readily polymerizable olefinic compounds such as methylmethacrylate, acrylonitrile, etc.

In the preparation of colored stock from resins of the class described, as exemplified by polystyrene, it is usual to employ a masterbatch technique. That is, a carefully proportioned, uniform mixture of relatively finely divided polystyrene and the desired pigments or other colorant is first prepared and this mixture is admixed in desired amount with significantly larger amounts of colorless polystyrene. Thereafter, the total mixture is heat-plastified and mechanically mixed to bring about uniform distribution of the colorant throughout the plastic mass.

In practice, the blending of the colorless polystyrene resin and the masterbatch is usually carried out on a continuous basis. The two materials are fed to an extruder-blender maintained at the temperature necessary for heat plastification and are therein intimately blended and extruded for further processing such as being chopped or ground to a size suitable for injection molding, for example.

It is obvious that close control must be maintained over the composition of the masterbatch at all times, inasmuch as even minor variation in its composition will be reflected in undesirable color value in relatively large amounts of final product. Since it is practically impossible to economically adjust the color of the final product any undue variation in masterbatch composition leads to wasteful scrap losses.

Not only must a given amount of master batch possess an overall uniform composition, but it is additionally requisite that the colorant be uniformly distributed throughout the resin for the reason that local concentration of color will also lead to color changes in the final product even though, during a given period of operation, the balance of colorant, carrier and colorless resin is maintained at a desired value.

This uniformity of distribution is difficult to achieve and maintain in practice inasmuch as the polystyrene or similar carrier resin component of the masterbatch is ordinarily in the form of relatively large granules while the colorant is generally a very fine powder.

The mixing of the carrier resins and the colorant is readily carried out in any of a variety of mixing devices such as a ribbon blender, tumbling barrels, and the like. Initial uniform distribution of the component can readily be achieved if the mixing operation be continued for a sufficient period. Subsequent handling of the mixture can, however, cause sifting of the colorant to the bottom of a container holding the mixture. Thus, the material at the bottom of the container may be enriched in colorant at the expense of overlying material. If this masterbatch is not re-mixed before use, color variation in the final product will necessarily follow.

However, even if such a dry masterbatch be prepared immediately before use, similar difficulties may result in the mere conveying of the material to the extruder-blender. In almost any conveying equipment, the conveyed material is subjected to some mechanical working, even if this be limited to mere vibration. This has the result of causing at least some separation of the components and build-up of the thus separated colorant on the surfaces of the conveying equipment in contact with the material. To the extent that this colorant separation takes place, undesirable variation in color in the final product results.

Furthermore, because of the fine state of subdivision of most colorants, dry blending causes a serious dust problem with the possibility of contamination of product.

It has in the past been attempted to meet these problems by the expedient of adding to the mixture of colorant and carrier resin a minor amount of mineral oil or other plasticizer in an attempt to wet the resin granules and cause the colorant to adhere thereto. Relative to the problem of dusting this expedient has been relatively successful. However, it fails to prevent color variation in the product.

This failure is apparently due to the fact that the adhesion developed between colorant and carrier granule surface, while sufficient to prevent dusting, is not great enough to prevent the wiping of colorant from the granules. Because of this, colorant admixed with the plasticizer, e.g. mineral oil, tends to deposit on the surfaces of equipment conveying the material from the mixing station to the extruder blender. In addition to causing impoverishment of colorant in the blend, another problem is introduced thereby. Because of its content of plasticizer, the colorant is no longer a dry, dusty powder, but a wetted material which compacts and builds up in zones on the surfaces of conveying equipment. This built-up material tends to break away as masses or agglomerates and is carried to the extruder-blender in such form. Depending on the efficiency of the subsequent blending operation this will either cause a temporary increase of color value in the extrudate or it will cause mottling or the appearance of specks of color therein.

This difficulty also results from the tendency of the colorant-plasticizer mixture to coalesce into small balls or pellets.

It is therefore an object of the invention to provide a method of producing non-dusting blends of alkenyl aromatic resin molding granules and powdered additaments therefore. It is more particularly an object of the invention to provide a method of producing uniform blends of alkenyl aromatic resin molding granules and powdered colorant material therefore which exhibit minimum tendency to separation of the components of said blends.

Still other objects will be evident from a consideration of the specification and examples to follow.

It has unexpectedly been found that blends of alkenyl aromatic resin molding granules and finely divided additaments therefore of excellent mechanical stability can be produced by incorporating in such blends a minor but effective amount of sucrose diacetate hexaisobutyrate, hereinafter referred to simply as "sucrose acetate isobutyrate." The blends so produced, when subjected to the conditions involved in packaging, storing, conveying and other handling that may be involved in their employment, maintain their uniformity of composition and exhibit negligible tendency to separation of components. They are, therefore, ideally adapted to use as master batches in the production of colored alkenyl aromatic resinous materials.

Sucrose acetate isobutyrate, manufactured by Tennessee Eastman Company, is an extremely viscous liquid which finds use as a plasticizer for a wide variety of resinous materials. It has the property of undergoing an abrupt and marked lowering of viscosity with elevation in temperature or with the addition of small amounts of solvent.

Because of the highly viscous nature of sucrose acetate isobutyrate at room temperature it is impractical, both from the viewpoint of accurate measurement and of mixing ease, to employ the material in undiluted form. Accordingly, it is advantageously admixed with a solvent with which it is compatible and which is also compatible with the alkenyl aromatic resin. Less desirably, it may be admixed with a relatively volatile solvent which will serve to lower the viscosity to a practical value and which, after the blend of the solution with the resin has been prepared, may be removed by evaporation at either ambient or somewhat elevated temperature.

Of the former class of solvents, those compatible both with the resin and the sucrose acetate isobutyrate, the group comprising the ester-type of plasticizer is well adapted to be used in conjunction with the sucrose ester. These are quickly absorbed into the resin so that they do not interfere with the action of the sucrose ester and provided solutions of a practical viscosity.

While in the preparation of the masterbatch, the order of addition of the sucrose ester and of the pigment powder is not critical, it is preferable to first intimately admix the powder and the resin granules and then to add the sucrose acetate isobutyrate and its diluent. In general, it will be found that a shorter mixing schedule is possible if the materials are added to the resin in that sequence.

The amount of the sucrose ester to be employed depends primarily on the extent of pigment loading desired in the master batch. In general, the sucrose ester will amount to from about 5 percent to about 15 percent by weight of the weight of pigment employed. Inasmuch as the amount of pigment usually does not exceed a value equal to about 20 percent of the weight of the carrier resin, the maximum amount of sucrose ester that need by employed will be of the order of about 3.0 percent of the weight of the carrier resin. Correspondingly, the minimum amount to be employed will generally be about 1.0 percent of the weight of carrier resin. Nevertheless, smaller amounts, as little as 0.5 percent, may be employed if desired. The amount to be employed in a given case will readily be determined by those skilled in the art.

When the sucrose acetate isobutyrate is employed in the form of its solution in a plasticizing agent for the resin, the latter material will advantageously constitute at least about 50 percent of the weight of the solution. While solutions containing somewhat more sucrose acetate isobutyrate than this amount may be employed if desired, it will generally be found that such solutions are somewhat too viscous for easy handling and measuring. Solutions of equal parts of sucrose ester and plasticizer are readily handled and measured and make it possible to keep the amount of plasticizer to a low value if desired.

The invention is illustrated in and by the following examples, which are intended to be merely demonstrative and not limiting, and wherein all parts and percentages are on a weight basis.

Example 1

To 100 parts of standard polystyrene molding granules contained in a bowl of a Hobart food mixer equipped with a wire globe beater there were added slowly, with agitation, 10 parts of finely divided carbon black. Agitation was continued for 4 minutes, at the end of which time there were added 4 parts of a mixture of equal parts of dioctyl phthalate and sucrose acetate isobutyrate. Agitation was continued for 4 minutes, at the end of which time there were added 4 parts of a mixture of equal parts of dioctyl phthalate and sucrose acetate isobutyrate. Agitation was continued for an additional 4 minutes. The resultant material was dustless and free flowing.

A determination of the stability of this blended material was made in the following manner. The bottom of a Petri dish was covered with a piece of filter paper of approximately the same diameter as the dish. The paper was then covered with the blend to a depth of approximately 0.5 centimeter. The dish was covered and shaken in the horizontal plane for a period of 30 seconds. The paper was then removed and observed to determine the extent of its discoloration. Only negligible blackening of the paper had occurred.

This method of determining stability is referred to hereinafter simply as the paper test.

Example 2

A blend of polystyrene and carbon black was prepared according to the procedure of Example 1, with the substitution of 0.1 part of mineral oil for the mixture of dioctyl phthalate and sucrose acetate isobutyrate. A non-dusting, free flowing material resulted which caused marked discoloration and smearing of the filter paper in the above described paper test.

Example 3

A blend of polystyrene and carbon black was prepared according to the procedure of Example 1, with the substitution of 2 parts of dioctyl phthalate for the mixture of dioctyl phthalate and sucrose acetate isobutyrate. A non-dusting, free-flowing material resulted which caused marked discoloration of the filter paper in the paper test.

Example 4

Carbon black and polystyrene molding granules were blended in the manner and in the proportions shown in Example 1. No liquid additament was employed. The product obtained was a dusty, free-flowing powder. In the paper test it caused pronounced blackening of the paper.

Example 5

Approximately 6 pounds of the blend described in Example 1 were fed through a vibratory conveyor during a period of three hours, the discharged material being continuously returned to feed the conveyor. At the end of this period examination of the conveyor surfaces disclosed only negligible discoloration.

Example 6

Approximately 6 pounds of the blend described in Example 2 were fed through a vibratory conveyor as described in Example 5 during a period of about three hours. Examination of the conveyor at the end of the operation disclosed build-up of pigment on the conveying surface.

Example 7

Approximately 6 pounds of the blend described in Example 3 were fed through a vibratory conveyor as described in Example 5 during a period of three hours. Marked discoloration of the conveying surface was observed.

*Example 8*

Approximately 6 pounds of the blend described in Example 4 were fed through a vibratory conveyor during a period of one-half hour. A relatively large amount of free carbon black separated from the blend during this period.

*Example 9*

A blend of polystyrene and carbon black were prepared according to the procedure of Example 1, with the substitution of 4 parts of a mixture of equal parts of a mixture of sucrose acetate isobutyrate and Stoddard solvent having a boiling point range of 300 to 400° F. The Stoddard solvent was removed by evaporation from the blend. A dustless, free flowing material was obtained which showed only negligible discoloration in the paper test.

*Example 10*

In the manner of Example 1 a number of blends were prepared consisting of 100 parts of standard polystyrene molding granules, 15 parts of colorant in the form of fine powder, and 4 parts of a mixture of equal parts of a plasticizer and sucrose acetate isobutyrate. The combinations of the plasticizer and colorant used were as follows:

(a) Hydrated Chromium Oxide Green—Dioctyl Phathalate
(b) Phthalocyanine Blue—Dibutyl Sebacate
(c) Phthalocyanine Green—Tricresyl Phosphate
(d) Cadmium Selenide—Acetyl Tributyl Citrate
(e) Cadmium Sulfide—Disobutyl Adipate
(f) Titanium Dioxide—Dibutyl Maleate.

Each of the above blends showed only minor deposition of color in the above described color test.

*Example 11*

Each of the masterbatch blends of Example 10 above were extruded-blended with polystyrene in the ratio of 3.5 parts of masterbatch to 100 parts of molding granules. All of the resultant extrudates displayed excellent uniformity of color and were totally free of mottling and the appearance of specks of undispersed pigment.

*Example 12*

A blend corresponding to (c) of Example 10 was prepared with the substitution for the polystyrene granules of granules of a copolymer containing, in chemically combined form, 70 percent by weight of styrene and 30 percent of acrylonitrile. The blend gave substantially no discoloration in the paper test and, when extruder blended with colorless copolymer in the ratio of 3.0 parts of masterbatch blend to 100 parts of colorless copolymer, gave an extrudate of excellent color uniformity and colorant dispersion.

*Example 13*

The preparation described in Example 12 was repeated with the amount of the plasticizer-sucrose acetate butyrate mixture used being reduced to 2.0 parts. The resulting dustless product showed only minor discoloration in the paper test.

*Example 14*

A blend of carbon black and polystyrene was prepared by a variation of the procedure of Example 1. The mixture of dioctyl phthalate and sucrose acetate isobutyrate was first added, with agitation, to the polystyrene granules. Agitation was continued for 4 minutes after which the carbon black was added. Agitation was continued for an additional 10 minutes. The resultant material was dustless and free-flowing and gave only negligible discoloration in the paper test.

What is claimed is:
1. A method for preparing a dry, mechanically stable, free-flowing blend comprising granules of a monovinyl aromatic resin of the benzene series and a powdered pigment therefor, said method comprising intimately admixing said granules, said pigment and an amount of sucrose diacetate hexaisobutyrate effective to substantially prevent the separation of the pigment from the resulting intimate admixture.

2. A method for preparing a dry, mechanically stable, free-flowing blend comprising granules of a monovinyl aromatic resin of the benzene series and a powdered pigment therefor, said method comprising first intimately admixing said granules and said pigment to form a first intimate admixture thereof and subsequently intimately admixing with said first intimate admixture an amount of sucrose diacetate hexaisobutyrate effective to substantially prevent the separation of said pigment from the final resulting intimate admixture.

3. A method for preparing a dry, mechanically stable, free-flowing blend comprising granules of a monovinyl aromatic resin of the benzene series and a powdered pigment therefor, said method comprising first intimately admixing said granules and sucrose diacetate hexaisobutyrate to form a first intimate admixture thereof and subsequently intimately admixing said pigment with said first intimate admixture, said sucrose diacetate hexaisobutyrate being employed in an amount effective to substantially prevent the separation of the pigment from the total intimate admixture.

4. A method for preparing a dry, mechanically stable, free-flowing blend comprising granules of a monovinyl aromatic resin of the benzene series and a powdered pigment therefor, said method comprising first intimately admixing said granules and said pigment to form a first intimate admixture thereof and subsequently intimately admixing with said first intimate admixture an amount of sucrose diacetate hexaisobutyrate effective to substantially prevent the separation of said pigment from the final resulting intimate admixture, said sucrose diacetate hexaisobutyrate being in the form of its solution in a plasticizing agent for said resin.

5. A method for preparing a dry, mechanically stable, free-flowing blend comprising granules of a monovinyl aromatic resin of the benzene series and a powdered pigment therefor, said method comprising first intimately admixing said granules and said pigment to form a first intimate admixture thereof and subsequently intimately admixing with said first intimate admixture an amount of sucrose diacetate hexaisobutyrate effective to substantially prevent the separation of said pigment from the final resulting intimate admixture, said sucrose diacetate hexaisobutyrate being in the form of a solution in a volatile solvent therefor, and thereafter effecting the evaporation of said solvent from the resulting intimate admixture.

6. A method according to claim 2 wherein the sucrose diacetate hexaisobutyrate is employed in an amount equal to from about 0.5 percent to about 3.0 percent by weight of the weight of the resin granules.

7. A method according to claim 4 wherein the sucrose diacetate hexaisobutyrate is employed in an amount equal to from about 0.5 percent to about 3.0 percent by weight of the weight of the resin granules and the plasticizing agent is employed in an amount at least equal in weight to the weight of the sucrose diacetate hexaisobutyrate.

8. A composition of matter comprising a substantially uniform admixture of granules of a monovinyl aromatic resin of the benzene series, a powdered pigment present in an amount up to about 20 parts and from about 0.5 part to about 3.0 parts of sucrose diacetate hexaisobutyrate, the quantities of pigment and sucrose diacetate hexaisobutyrate being based on 100 parts of said resin granules.

9. A composition of matter comprising a substantially uniform admixture of granules of a monovinyl aromatic resin of the benzene series, a powdered pigment present in an amount up to about 20 parts, from about 0.5 to about 3.0 parts of sucrose diacetate hexaisobutyrate, and a plasticizer for said resin present in an amount up to about 3.0 parts, said plasticizer being a solvent for said sucrose diacetate hexaisobutyrate, the quantities of pigment, sucrose diacetate hexaisobutyrate and plasticizer being based on 100 parts of said resin granules.

10. A composition of matter comprising a substantially uniform admixture of polystyrene granules, a powdered pigment present in an amount up to about 20 parts and from about 1 part to about 6 parts of a solution of equal parts of sucrose diacetate hexaisobutyrate and a plasticizer for said polystyrene, the quantities of pigment and solution being based on 100 parts of said polystyrene granules.

11. A composition of matter according to claim 10 in which the plasticizer is dioctyl phthalate.

References Cited in the file of this patent
UNITED STATES PATENTS
2,931,802    Touey et al. _____ Apr. 5, 1960